United States Patent [19]
Jones

[11] Patent Number: 6,135,871
[45] Date of Patent: Oct. 24, 2000

[54] PNEUMATIC ANIMAL STUNNER

[76] Inventor: Arthur Jones, 67286 255$^{th}$ St., Tabor, Iowa 51653-4018

[21] Appl. No.: 09/558,009

[22] Filed: Apr. 24, 2000

[51] Int. Cl.$^7$ ............................................. A22B 3/00
[52] U.S. Cl. .............................. 452/62; 173/114; 227/130
[58] Field of Search ......................... 452/62, 57; 173/114; 227/130

[56] References Cited

U.S. PATENT DOCUMENTS

| | | | |
|---|---|---|---|
| D. 274,689 | 7/1984 | Hamel et al. ............................... | D8/68 |
| D. 334,876 | 4/1993 | Swetish ................................... | D8/29.1 |
| 1,699,519 | 1/1929 | Brown . | |
| 3,060,441 | 10/1962 | Henning ........................................ | 1/47 |
| 3,579,889 | 5/1971 | Pallich ...................................... | 452/62 |
| 3,602,419 | 8/1971 | Doberne et al. ........................ | 227/147 |
| 3,782,018 | 1/1974 | Hancox .................................... | 42/1 M |
| 3,798,707 | 3/1974 | Willems et al. . | |
| 3,891,133 | 6/1975 | Maier et al. .............................. | 227/10 |
| 4,219,905 | 9/1980 | Thacker et al. . | |
| 4,280,248 | 7/1981 | Herubel . | |
| 4,351,464 | 9/1982 | Fehrs et al. ................................ | 227/7 |
| 4,439,889 | 4/1984 | Karubian . | |
| 4,446,599 | 5/1984 | Karubian, et al. ........................ | 452/62 |
| 4,497,377 | 2/1985 | Haytayan ................................. | 173/15 |
| 4,503,585 | 3/1985 | Hamel et al. . | |
| 4,519,536 | 5/1985 | Steigauf ................................... | 227/147 |
| 4,575,900 | 3/1986 | Hamel et al. . | |
| 5,669,541 | 9/1997 | Ronconi .................................... | 227/8 |
| 5,687,897 | 11/1997 | Fa et al. .................................... | 227/8 |
| 5,692,951 | 12/1997 | Huff ......................................... | 452/62 |

FOREIGN PATENT DOCUMENTS 1391454  4/1975  United Kingdom ..................... 452/62

OTHER PUBLICATIONS

EFA Processing Equipment Company advertisement for "The Terminator Air–Operated Stunning Device", undated.

*Primary Examiner*—Willis Little
*Attorney, Agent, or Firm*—Zarley, McKee, Thomte, Voorhees & Sease; Dennis L. Thomte

[57] ABSTRACT

Described is a pneumatic animal stunner that includes a physical catch for the piston that drives the stunning element. This allows pressure to build up behind the stunning element immediately prior to firing rather than requiring the introduction of pressurized air or fluid at the time of actuation, as is common in the prior art. The result is a faster, more effective stroke. The animal stunner also includes a dual trigger mechanism for safety. The animal stunner has a conventional trigger that is activated to pressurize the stunner and an activation means located in its front end. The activation means releases a physical catch that retains the piston in place. Preferably, the activation means is operated when depressed against the animal. The animal stunner is designed so that the stunning element may not be fired more than once for each time the trigger is pulled. In addition, the animal stunner includes exhaust vents that are directed toward the front of the device. By exhausting pressurized fluid toward the front of the device, excessive build up of animal tissues and other debris in the mechanism is prevented, reducing the need for maintenance.

10 Claims, 7 Drawing Sheets

PNEUMATIC ANIMAL STUNNER

BACKGROUND OF THE INVENTION

1. Field of the Invention

This invention relates to an animal stunner for use in livestock/slaughterhouse operations, which features a faster stroke for more efficient operation, improved safety features, and a low maintenance design.

2. Description of the Related Art

In livestock production plants, it is important to stun and disable an animal for processing. Although numerous methods have been used to stun livestock, captive bolt mechanisms have proven to be the most efficient, inexpensive, and humane way to disable the animal. Particularly, pneumatic captive bolt devices have been used in this capacity.

Previous captive bolt devices have not proven to be as safe and effective as desired. Prior art captive bolt devices do not necessarily include a safety mechanism to prevent the inadvertent actuation of the device. Furthermore, the speed of the stunning element in prior art pneumatic devices has been limited by the manner in which fluid was introduced behind the captive bolt element. Finally, several prior art captive bolt devices have not employed a mechanism to prevent the build up of animal matter in the devices, causing clogging, misoperation, and production delays.

SUMMARY OF THE INVENTION

The pneumatic animal stunner described herein overcomes the shortcomings of the prior art captive bolt devices. The animal stunner of this invention includes a physical catch for the piston that drives the stunning element. This allows pressure to build up behind the stunning element immediately prior to firing rather than requiring the introduction of pressurized air or fluid at the time of actuation, as is common in the prior art. The built up pressure provides a much faster, more efficient stroke of the stunning element.

In addition, the animal stunner described herein includes a dual trigger mechanism. The animal stunner includes a conventional trigger that is activated to pressurize the stunner. The animal stunner also includes an activation means located in its front end. The activation means releases a physical catch that retains the piston in place. Preferably, the activation means is operated when depressed against the animal. The animal stunner is designed so that the stunning element may not be fired more than once for each time the trigger is pulled. The single fire device is an improvement over previous animal stunners having dual trigger mechanisms. Prior art dual trigger mechanisms required only that both triggers be activated; they do not include the feature of requiring the deactivation of the trigger and the activation means prior to a subsequent firing of the device.

In addition, the animal stunner described herein includes exhaust vents that are directed toward the front of the device. By exhausting pressurized fluid toward the front of the device, excessive build up of animal tissues and other debris in the mechanism is prevented, reducing the need for maintenance.

Accordingly, it is an object of the invention to provide a pneumatic animal stunner having a much faster stroke than the captive bolt devices of the prior art.

It is another object of this invention to provide a pneumatic animal stunner having a separate trigger and activation means.

It is yet another object of this invention to provide a pneumatic animal stunner having a catch that retains the piston that drives the stunning element against the urging of pressurized fluid.

It is a further object of this invention to provide a pneumatic animal stunner that requires actuation of a trigger and an activation means to activate the stunning device, and deactuation of both the trigger and the activation means prior to a subsequent firing of the device.

It is a further object of this invention to provide a pneumatic animal stunner that prevents the build up of debris within the stunner, reducing the need for maintenance.

These and other objects of the invention will be apparent to those skilled in the art.

DESCRIPTION OF THE PREFERRED EMBODIMENT

The pneumatic livestock stunner of this invention is referred to generally by the reference numeral 10. Stunner 10 includes an elongated hollow housing 12 having a nose end 14 and a threaded tail end 16. Housing 12 is provided with an enlarged annular shoulder 18 adjacent tail end 16. Housing 12 further includes exhaust passageway 24 formed therein which extends toward the nose end 14 thereof.

Figure 1:
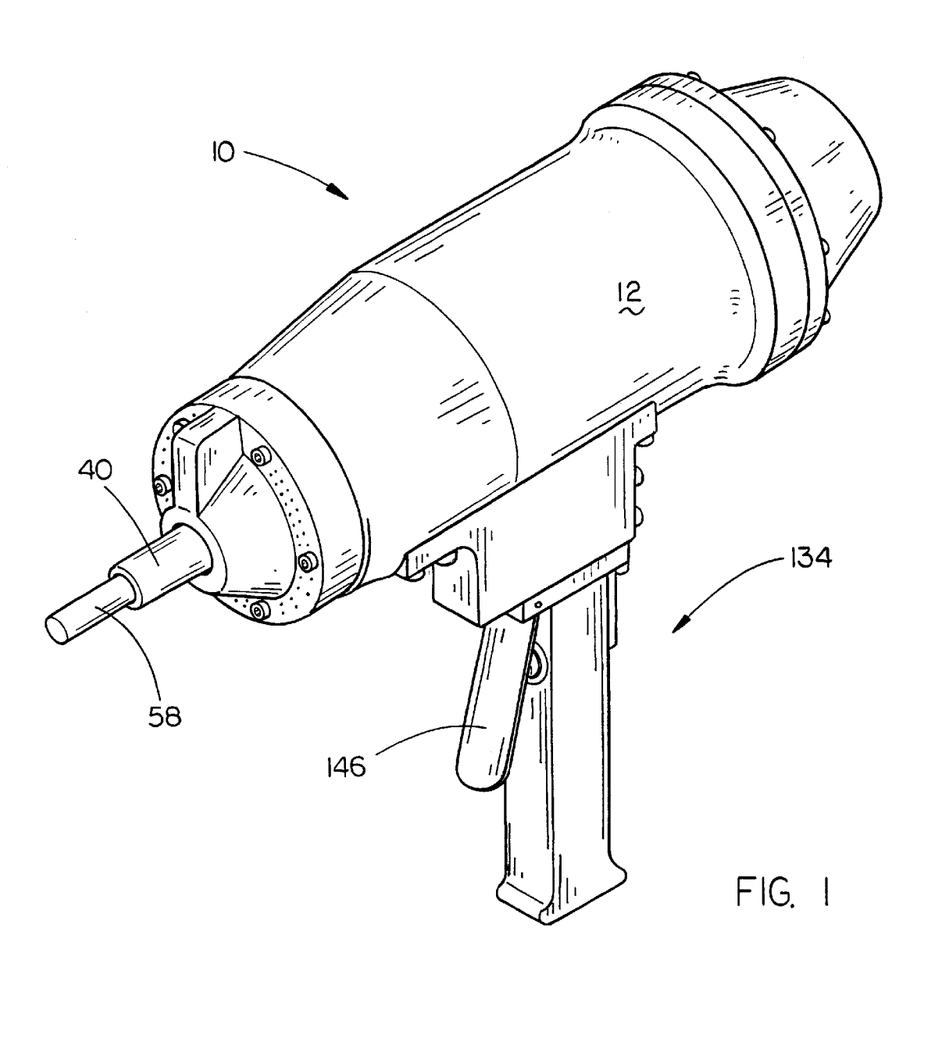
FIG. 1 is a perspective view of the animal stunner of this invention.
Figure 2:
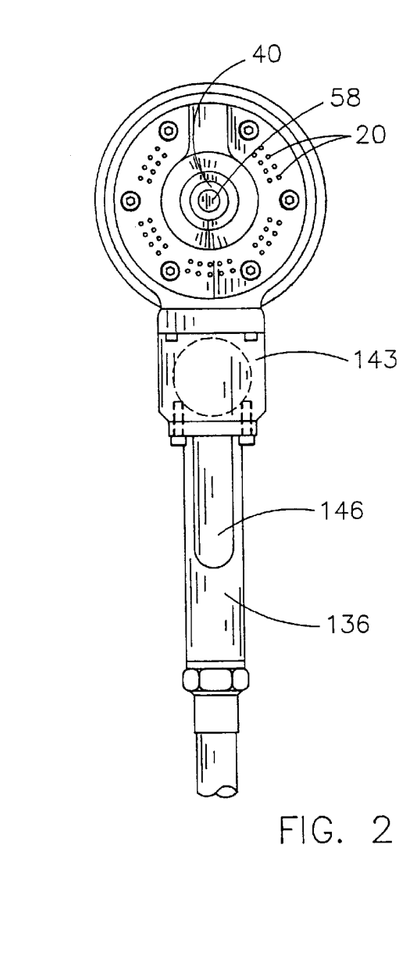
FIG. 2 is a front elevational view of the animal stunner.
Figure 3:
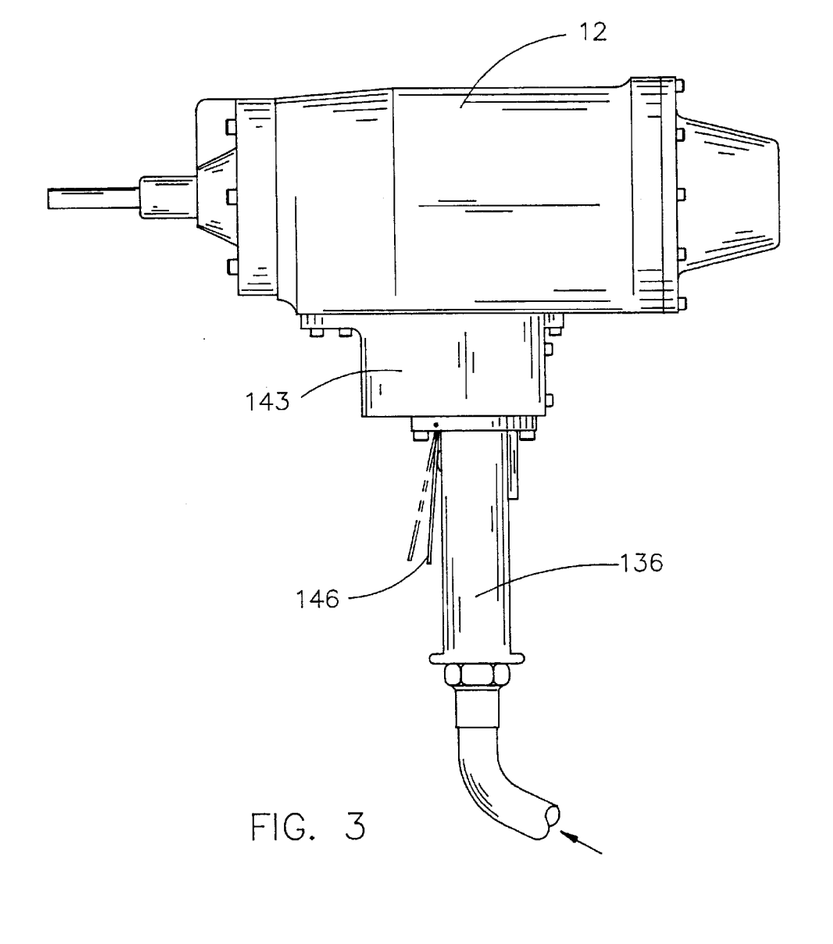
FIG. 3 is a side elevational view of the animal stunner.
Figure 4:
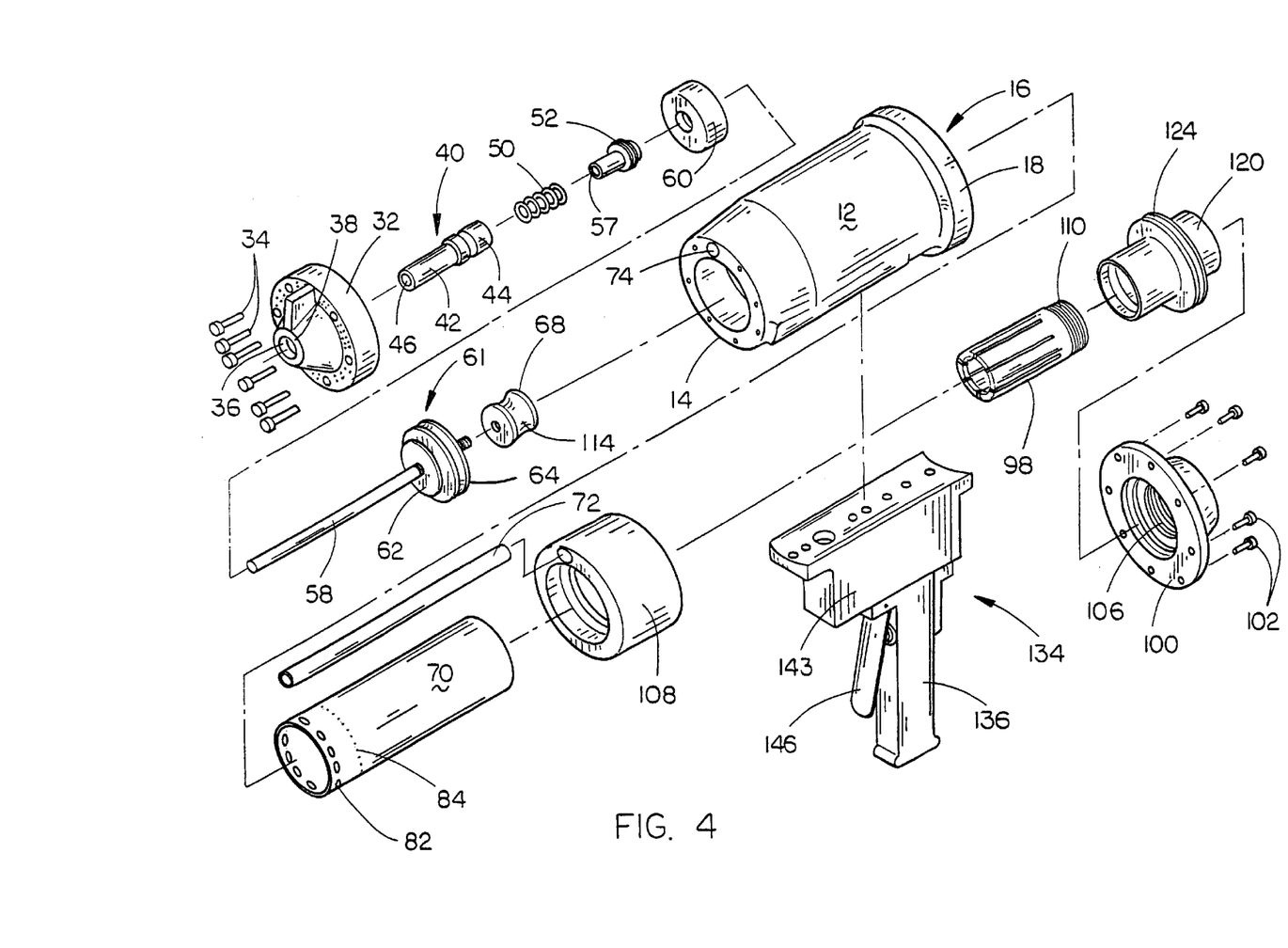
FIG. 4 is an exploded view of the animal stunner.

Nose 32 has a plurality of spaced-apart openings 20, as seen in FIG. 4. Openings 20 communicate with the passageway 24 formed in the inside wall of housing 12. Nose 32 is secured to the nose end 14 of housing 12 by screws or bolts 34 and has a bore 36 extending therethrough, which includes a shoulder 38. Head contactor 40 is slidably mounted in bore 36 and includes a shaft portion 42 and enlarged portion 44. Head contactor 40 has a bore 46 extending therethrough which communicates with chamber 48 at the inner end thereof and which is adapted to receive one end of spring 50 which in turn receives nose shaft guide 52 which is threaded to nose 32. A plurality of spaced-apart O-ring seals 56 are provided between nose 32 and head contactor 40, as seen in FIGS. 5–8. Nose shaft guide 52 has a longitudinally extending bore 57 extending therethrough, which slidably receives stunning shaft 58. Stunning shaft 58, when fired as will be explained hereinafter, slidably extends through bore 46 of head contactor 40 with sufficient force to stun the livestock.

Figure 5:
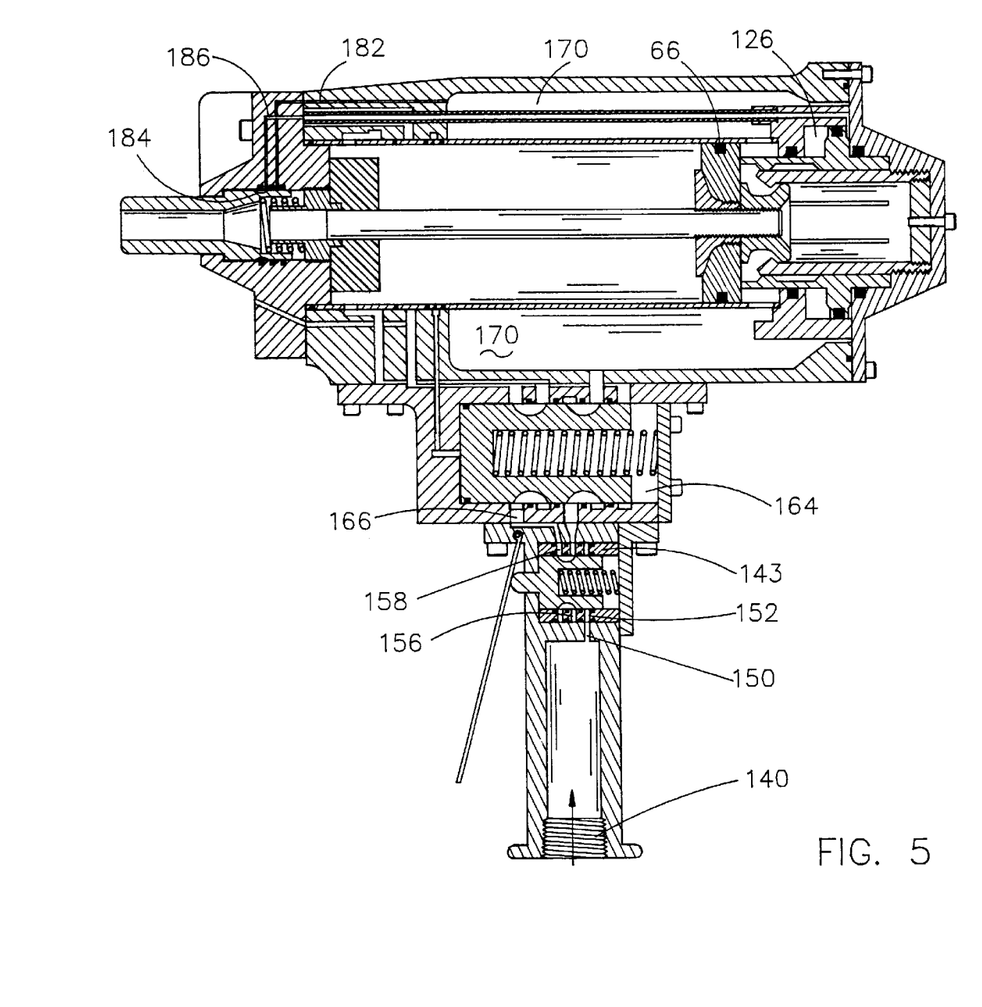
FIG. 5 is a side sectional view of the animal stunner with the trigger and activation means each being in a closed position.

A resilient ring-shaped cushion 60 is mounted on the inner end of nose shaft guide 52 to cushion and stop the striking movement of the stunning element 61 and particularly the stunning shaft 58 through contact with the piston flange 62 of piston 64. As seen in FIG. 5, piston flange 62 is threadably secured to the inner end of shaft 58 with piston 64 being threadably secured to piston flange 62. An O-ring seal 66 is positioned in the periphery of piston 64. Piston nut 68 is threaded onto the inner end of shaft 58, as also seen in FIG. 5.

The inner end of nose 32 is provided with a recessed area 71 which not only abuts the end of housing 12, but which also abuts one end of an elongated hollow cylinder 72. Cylinder 72 is housed in a bore 74 in the housing 12. Cylinder liner 70 is positioned in housing 12 and is in the form of a hollow cylinder and has a plurality of slot-like openings 82 formed therein at one end thereof and a plurality of openings 84 formed therein which are spaced from openings 82. Cylinder liner 70 has a plurality of O-ring seals 76 at its outside surface.

A substantially cylindrical catch 98 is positioned at the tail end of housing 12 and is secured thereto by means of a catch top housing 100 having bolts or screws 102 extending therethrough. The catch top housing 100 is internally threaded at 106. A cylindrical catch 98 is received by catch top housing 100 and has external threads 110 threaded to the internal threads 106. The cylindrical catch 98 is adapted to selectively receive the piston nut 68 which has an annular groove 114 formed therein.

Figure 7:
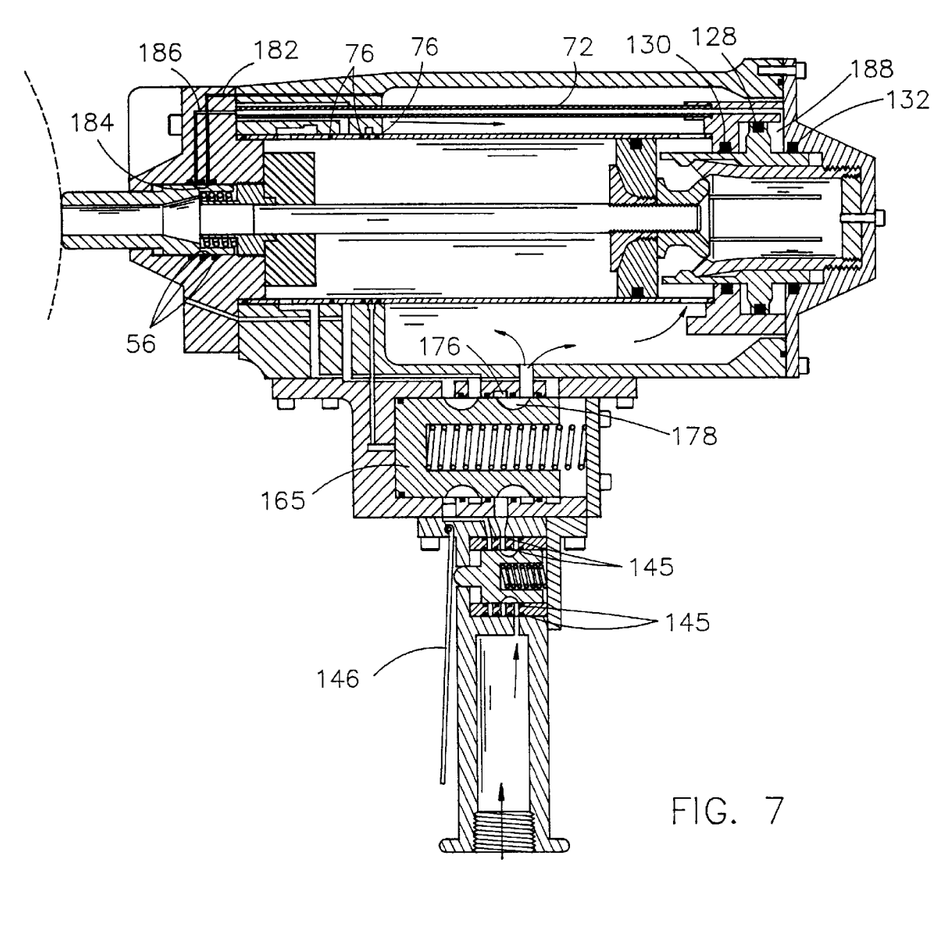
FIG. 7 is a side sectional view of the animal stunner of this invention with the trigger and activation means being in an open position.

Catch piston 120 slidably embraces cylindrical catch 98 and has an annular shoulder 122 formed in its interior wall surface which is adapted to engage the outer surface cylindrical catch 98 when catch piston 120 has moved from the position of FIG. 5 to the position of FIG. 7, as will be described hereinafter. Catch piston 120 has an annular piston 124 extending radially therefrom, which is slidably received by chamber portion 126 formed in catch housing 108. An O-ring seal 128 is provided between the outer end of piston 124 and catch housing 108. An O-ring seal 130 is provided between catch housing 108 and catch piston 120. An O-ring seal 132 is provided between catch top housing 100 and catch piston 120. Although shown as separate parts, catch housing 108 and housing 12 may be integrated.

The numeral 134 refers to the trigger assembly utilized in this invention and which is secured to housing 12 by screws or bolts. Trigger assembly 134 includes a handle 136 having an internal bore 138 which is connected to a source of fluid pressure by way of a flexible hose threadably received by internal threads 140 in conventional fashion. The fluid normally employed and described herein will be air. A normally closed, movable trigger valve 142 is movably mounted in trigger valve support block 143 mounted in handle 136 and is urged to its closed position by spring 144. Trigger 146 is pivotally connected to handle 136 at 148 for moving trigger valve 142 to its inner open position.

Passageway 150 extending from bore 138 communicates with a passageway 152, formed in trigger valve support block 143. An annular passageway 154 is formed in trigger valve 142 which communicates with passageways 156 and 158 formed in trigger valve support block 143 when trigger valve 142 is in its closed position as shown in FIG. 5. The passageways 156 and 158 communicate with passageways 160 and 162 that are formed in handle 136. O-ring seals 145 are provided on the inner and outer surfaces of support block 143 to prevent communication between the passageways 152, 156 and 158. Handle 136 also has a second handle portion 163 that defines a chamber 164 formed therein, the chamber 164 having a valve 165 positioned therein.

In the closed position, first pressure chamber 170 is in communication with annular passageway 178 in valve 165 through passageway 174. Annular passageway 174 is connected to passageway 176, which is in communication with passageway 160. As previously described, passageway 160 is in communication with passageway 166 when trigger valve 142 is in its closed position. Passageway 166 constitutes the first opening of exhaust vent 24. Therefore, when the trigger valve 142 is in its closed position, as shown in FIG. 5, first pressure chamber 170 is vented to the atmosphere.

Figure 6:
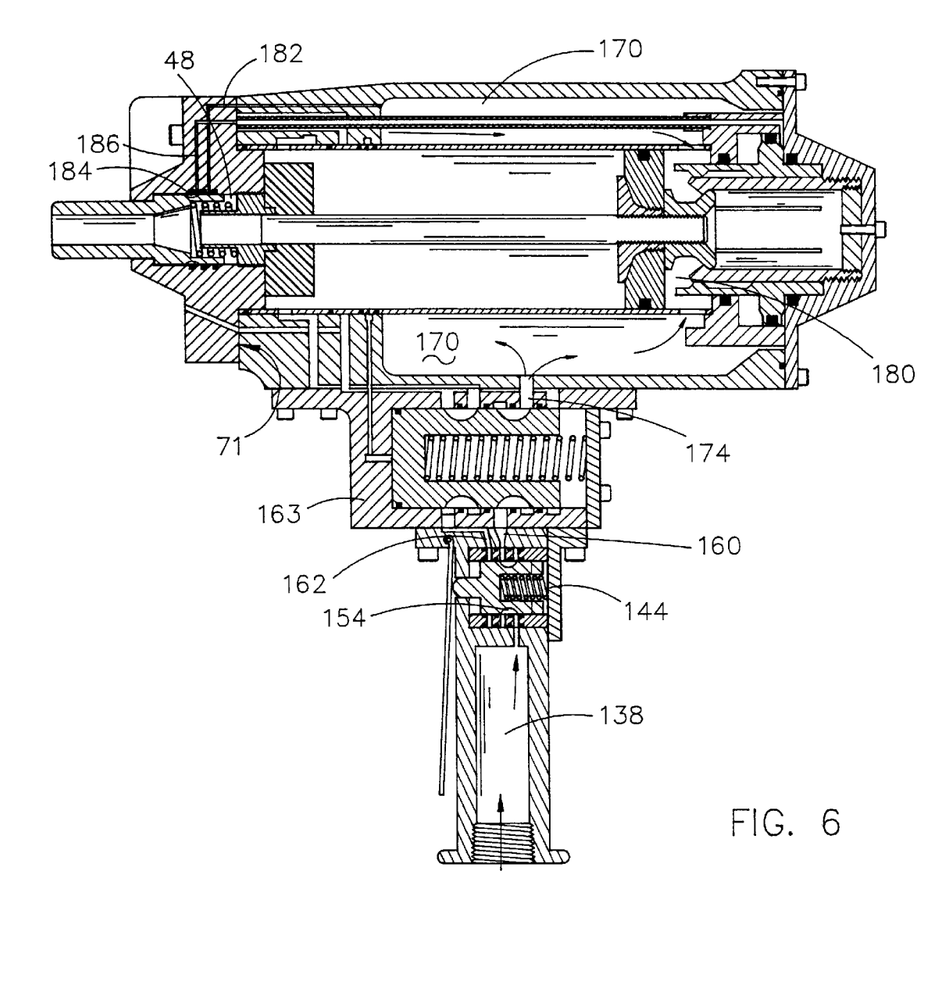
FIG. 6 is a side sectional view of the animal stunner of this invention with the trigger being in an open position and the activation means being in a closed position.

When trigger 146 is depressed, the trigger valve 142 is moved to its open position, as shown in FIG. 6. Air flows from the bore 138 through passageways 150, 152, annular passageway 154, passageways 156, 160 and 176, annular passageway 178, and passageway 174 to pressurize first pressure chamber 170. First pressure chamber 170 is in communication with second pressure chamber 180, which also becomes pressurized. Pressurized air in the second pressure chamber 180 urges the piston 64 toward the nose 32, as shown in FIG. 6. The piston 64 is, however, retained in place by the catch 98, which retains the piston nut 68.

Figure 8:
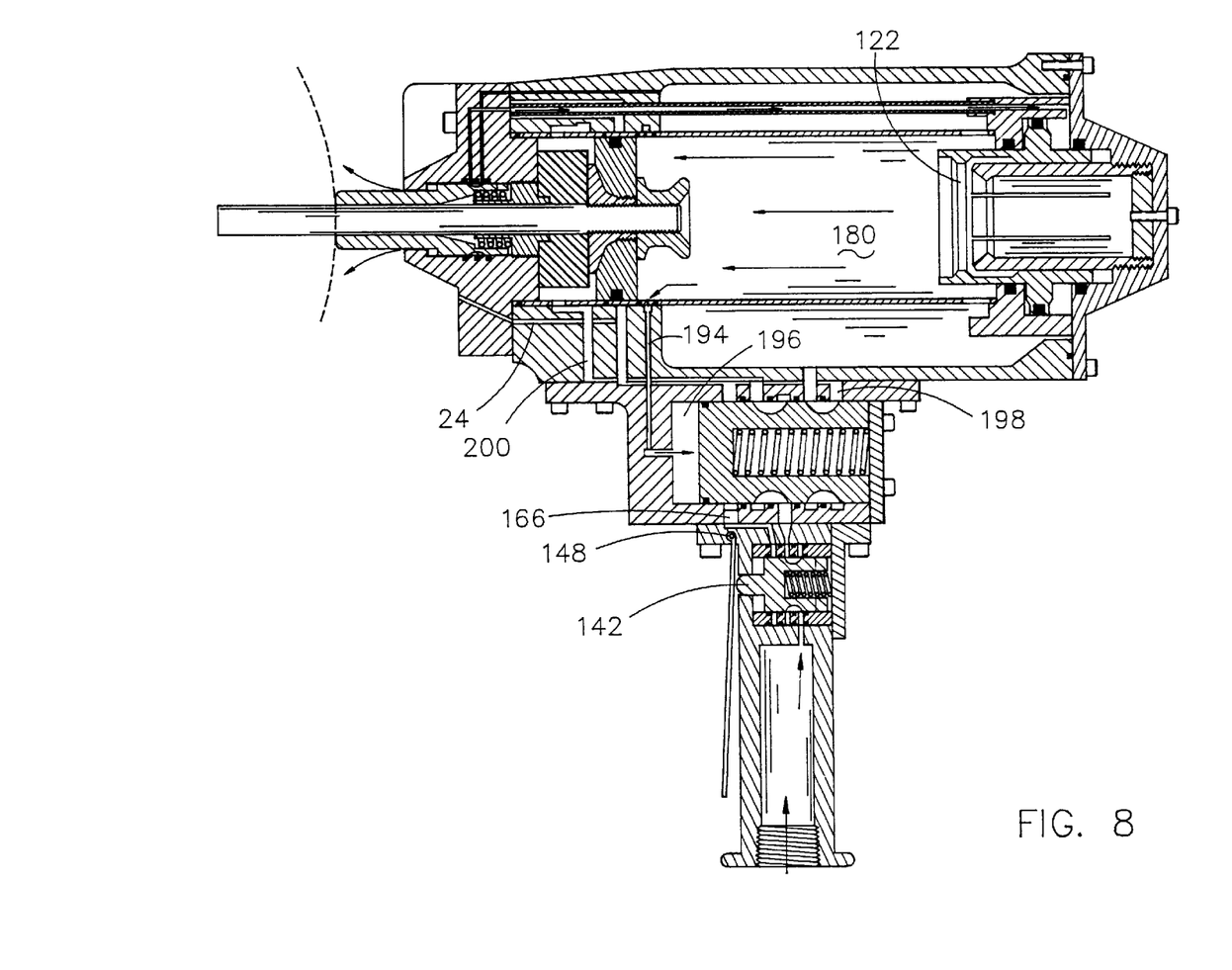
FIG. 8 is a side sectional view of the animal stunner with the trigger and activation means both being in an open position and the stunning element being in an extended position.

In order to extend the stunning shaft 58, the head contactor 40 must be depressed. When the head contactor 40 is depressed, air flows from passageway 182, which is in communication with first pressure chamber 170, through annular passageway 184 to passageway 186. Passageway 186 is in communication with catch air tube 72. Catch air tube 72 directs pressurized air into third pressure chamber 188. Pressurized air in third pressure chamber 188 urges the catch piston 120 toward nose 32. When catch piston 120 is moved toward nose 32, annular shoulder 122 ceases to engage the outer surface of cylindrical catch 98. Subsequently, piston 68 is released and stunning shaft 58 is directed toward nose 32 at a high rate of speed. Piston flange 62 strikes the cushion 60 to stop forward movement of the stunning shaft 58. It is important to note that the cylindrical catch 98 cannot release the piston nut 68 unless trigger 146 is depressed because the air for the third pressure chamber 188 comes from the first pressure chamber 170. As the piston flange 62 strikes cushion 60, air flows from chamber 180, through openings 84 in cylinder liner 70, through passage 194 to chamber 196 positioning valve 165 in its open position, as shown in FIG. 8.

Once valve 165 is in the open position, chamber 170 vents to passageway 174, to annular passageway 178, thence to second exhaust port 198. This also vents air from the third pressure chamber 188 through catch air tube 72. Pressurized air is directed from the bore 138 through a series of passageways to passageway 176 and then to passageway 200 and through openings 82 of cylinder liner 70, which forces the piston 64 toward the catch 98. The piston 64 strikes the forward edge of the catch piston 120 and forces the catch piston 120 backward so that shoulder 122 re-engages the catch 98 and secures the piston nut 68 therein. The piston 64 is unable to fire again until the catch piston 120 is again moved toward the nose 32.

When the trigger is released, air is vented from passage 200 to passage 166 and then to exhaust passage 26, where it is directed out of the nose 32. This also vents chamber 196, which allows valve 165 to return to its closed position. The trigger 146 must be released or air pressure in passage 196 will not allow valve 165 to return to its closed position, preventing more than one extension for each trigger depression.

When the head contactor 40 is retracted from contact, the head contactor spring 50 returns the head contactor 40 to its original position and air in passageway 186 is vented to atmosphere at the nose from around the head contactor 40, which has clearance within nose 32 to allow for the passage of air therearound.

Thus it can be seen that the invention accomplishes at least all of its stated objectives.

I claim:

1. A pneumatic animal stunner for stunning an animal comprising:

a housing having a front end and an inner chamber;

a trigger mounted on said housing;

an activation means mounted on said housing;

a piston movably mounted within said inner chamber of said housing, said piston and said inner housing defining a pressure chamber;

a penetrator rod mounted on said piston and extending toward said front end of said housing;

a catch mounted within said housing and adapted to releasably hold said piston in a contracted position; and a source of pressurized fluid in communication with said pressure chamber;

said trigger being adapted to control the flow of pressurized fluid from said source of pressurized fluid to said pressure chamber;

said pressurized fluid in said pressure chamber provided for urging said piston toward said front end of said housing;

said activation means being operatively connected to said catch to cause said catch to release said piston and allow said piston to move toward said front end of said housing to an extended position when the activation means is in contact with the animal;

said penetrator rod being adapted to extend into the animal and stun the animal when said piston is moved to said extended position.

2. The pneumatic animal stunner of claim 1 wherein the piston is automatically retracted to said contracted position.

3. The pneumatic animal stunner of claim 2 wherein the trigger is movable between an open position and a closed position and the trigger must be moved between said open position and said closed position before said piston may be moved from said contracted position to said extended position.

4. The pneumatic animal stunner of claim 1 further including an exhaust vent for the release of said pressurized fluid.

5. The pneumatic animal stunner of claim 4 wherein said exhaust vent is positioned in said front end of said housing.

6. The pneumatic animal stunner of claim 1 wherein the activation means comprises a head contactor mounted on said front end of said housing a valve.

7. The pneumatic animal stunner of claim 6 wherein the source of pressurized fluid is in communication with means for causing said catch to release said piston and said head contactor is adapted to control the flow of pressurized fluid from said source of pressurized fluid to said means for causing said catch to release said piston.

8. The pneumatic animal stunner of claim 7 further including an exhaust vent for the release of said pressurized fluid, said exhaust vent being positioned in said front end of said housing.

9. The pneumatic animal stunner of claim 8 wherein said exhaust vent for the release of said pressurized fluid is directed toward said head contactor.

10. The pneumatic animal stunner of claim 1 wherein said head contactor has a bore extending therethrough and said penetrator rod is adapted to extend through said bore.

* * * * *